(12) United States Patent
Szpak et al.

(10) Patent No.: US 7,558,721 B2
(45) Date of Patent: Jul. 7, 2009

(54) SIMPLIFIED DATA SIGNAL SUPPORT FOR DIAGRAMMING ENVIRONMENT LANGUAGES

(75) Inventors: Peter Szpak, Newton, MA (US); Matthew Englehart, Olmstead Falls, OH (US)

(73) Assignee: The MathWorks, Inc., Natrick, MA (US)

( * ) Notice: Subject to any disclaimer, the term of this patent is extended or adjusted under 35 U.S.C. 154(b) by 0 days.

(21) Appl. No.: 11/842,001

(22) Filed: Aug. 20, 2007

(65) Prior Publication Data

US 2007/0282585 A1    Dec. 6, 2007

Related U.S. Application Data

(62) Division of application No. 10/698,805, filed on Oct. 31, 2003, now Pat. No. 7,487,076.

(51) Int. Cl.
*G06F 17/50* (2006.01)

(52) U.S. Cl. ................. 703/14; 715/771; 715/853

(58) Field of Classification Search .......... 703/6, 703/13–14; 715/771, 853
See application file for complete search history.

(56) References Cited

U.S. PATENT DOCUMENTS

| | | | |
|---|---|---|---|
| 5,371,851 A | 12/1994 | Pieper et al. | |
| 5,881,267 A * | 3/1999 | Dearth et al. | 703/27 |
| 6,163,763 A | 12/2000 | Cox et al. | |
| 6,411,923 B1 * | 6/2002 | Stewart et al. | 703/25 |
| 6,470,482 B1 * | 10/2002 | Rostoker et al. | 716/6 |
| 6,883,147 B1 | 4/2005 | Ballagh et al. | |
| 7,167,817 B2 | 1/2007 | Mosterman et al. | |

OTHER PUBLICATIONS

Marshall C. Hall, III, et al., "Managing Simulator Wiring Information and Deriving System Continuity", 1991, IEEE, pp. 226-231.*
The MathWorks, Inc., "Using Simulink", 2001, The MathWorks, Inc., Version 4, pp. i through I-22.*
Eric Slutz, et al., "Block Description Language (BDL): A Structural Description Language", 1984, IEEE, pp. 81-85.*
Model Technology Inc., "ModelSim EE/Plus Reference Manual", 1999, Model Technology Inc., Version 5.2, pp. 1-581.*

(Continued)

*Primary Examiner*—Jason Proctor
(74) *Attorney, Agent, or Firm*—Lahive & Cockfield, LLP; Kevin J. Canning

(57) ABSTRACT

A computer-implemented method may include defining an input bus signal in a graphical block diagram model by associating the input bus signal with a first group of signals, at least two of the first group of signals having a different data type; defining an output bus signal in the graphical block diagram model by associating the second bus signal with a second group of signals, each of the second group of signals corresponding to one of the first group of signals; defining an input to a non-virtual operation block in the graphical block diagram model as the input bus signal; defining an output to the non-virtual operation block in the graphical block diagram as the output bus signal; and simulating an operation performed on the input bus signal by the non-virtual operation block, the operation being performed on each of the first group of signals and output to each of the second group of signals.

18 Claims, 14 Drawing Sheets

OTHER PUBLICATIONS

Bjarne Stroustrup, "The C++ Programming Language", 1997, Addision-Wesley Longman Inc., Third Edition, various pages.*

Drongowski, Paul J., et al., "A graphical hardware design language," Proceedings of the Design Automation Conference, Anaheim, Jun. 12-15, 1988, Proceedings of the Design Automation Conference (DAC), New York, IEEE, US, vol. Conf. 25, Jun. 12, 1988, pp. 108-114.

Lavagno, L., et al., "A Simulink © -based Approach to System Level Design and Architecture Selection," *Euromicro Conference, 2000. Proceedings of the 26th* Sep. 5-7, 2000, Los Alamitos, CA, USA, *IEEE Comput. Soc., US*, vol. 1, Sep. 5, 2000, pp. 76-83.

May, Phil, "A Flexible VHDL Test Bench Architecture," Military Communications Conference, 1992. MILCOM '92, Conference Record. Communications—Fusing Command, Control and Intelligence, IEEE, San Diego, CA, USA, Oct. 1992, New York, NY, USA, IEEE, US, Oct. 11, 1992, pp. 979-985.

Milam, William et al., "SmartVehicle Challenge Problems," Ford Motor Company, General Motors Corporation, Motorola Automotive and Industrial Electronics Group, pp. 1-10 (2001).

Molson, Philippe, et al., "Accelerating intellectual property design flow using Simulink® for system on a programmable chip," Conference Record of the 35th Asilomar Conference on Signals, Systems & Computers, Pacific Grove, CA, Nov. 4-7, 2001, Asilomar Conference on Signals, Systems and Computers, New York, NY: EEE, US, vol. 1 of 2, Conf. 35, Nov. 4, 2001, pp. 454-457.

Mrad, Fouad, et al., "Real-Time Control of Free-Standing Cart-mounted Inverted Pendulum using LabVIEW RT," *Proceedings of World Congress on Industrial Applications of Electrical Energy and 35th IEEE-IAS Annual Meeting*, vol. 2, Oct. 8, 2000, pp. 1291-1298.

Skahill, Kevin, "VHDL for Programmable Logic—Chapter 3, 'Entities and Architectures,'" *Cypress Semiconductor, Addison, Wesley*, Menlo Park, CA, USA, pp. 105-158 (1996).

Skelly, G.N., et al., "A LabVIEW Approach to Instrumentation for the TFTR Bumper Limiter Alignment Project," *Proceedings of the IEEE/NPSS Symposium on Fusion Engineering*, San Diego, Sep. 30-Oct. 3, 1991, New York, *IEEE*, US, vol. 2 Symp 14, Sep. 30, 1991, pp. 765-768.

The Mathworks, "Simulink Model-Based and System-Based Design, Using Simulink," The Mathworks, Version 4, pp. i-xvi, 1-1 to 1-10, 9-66 to 9.67 (2001).

International Search Report Application No. PCT/US2004/034904, dated Nov. 11, 2005.

The MathWorks, "Simulink® Model-Based and System-Based Design, Using Simulink, Version 5," *The MathWorks, Inc.*, (2002).

Xilinx, Inc., "Model*Sim* XE User's Manual, Version 5.3, The Ultimate Tool for VHDL or Verilog Simulation," Xilinx, Inc., (2000).

PCI Local Bus, "PCI Local Bus Specifications, Production Version, Revision 2.1, " *PCI Special Interest Group*, pp. 1-298 (1995).

* cited by examiner

```
function y = fcn(u)
% This example bus access sets bus output type
% foo as as function of bus input type foo.
% Note that the Embedded MATLAB script (textural
% based language inside Simulink) can access
% elements of a bus directly.
y.field2 = u.field1 * 2;
```

Fig. 12

SIMPLIFIED DATA SIGNAL SUPPORT FOR DIAGRAMMING ENVIRONMENT LANGUAGES

RELATED APPLICATIONS

This application is a divisional of U.S. patent application Ser. No. 10/698,805, filed Oct. 31, 2003, which is hereby incorporated by reference.

FIELD OF THE INVENTION

The present invention relates to diagraming environments, such as graphical modeling environments, that enable a user to model, simulate, and analyze dynamic systems. More specifically, the present invention relates to bus signals in a graphical modeling environment for grouping together a number of signals in a graphical model representing a dynamic system.

BACKGROUND OF THE INVENTION

Graphical modeling environments are programs that enable a user to construct and analyze a model of a process or system. Examples of graphical modeling tools include time-based block diagrams, such as Simulink from The MathWorks Inc., state-based and flow diagrams, such as those found within Stateflow® also available from The MathWorks, Inc., data-flow diagrams, such as LabVIEW, available from National Instruments Corporation, and software diagrams and other graphical programming environments, such as Unified Modeling Language (UML) diagrams.

Time-based block diagrams, which are an example of a type of graphical modeling environment, are software packages that enable a user to model, simulate, and analyze dynamic systems i.e., systems whose outputs change over time, and generate a program corresponding to the system. Time-based block diagrams environments can be used to explore the behavior of a wide range of real-world dynamic systems, including electrical circuits, shock absorbers, braking systems, and many other electrical, mechanical, and thermodynamic systems.

Simulating a dynamic system in a time-based block diagram is typically a two-step process. First, a user creates a graphical model, such as a block diagram, of the system to be simulated. A graphical model may be created using a graphical user interface, such as a graphical model editor. The graphical model depicts time-based relationships between the systems inputs, states, parameters and outputs. After creation of the graphical model, the behavior of the dynamic system over a specified time period is simulated using the information entered into the graphical model. In this step, the graphical model is used to compute and trace the temporal evolution of the dynamic systems' outputs ("execute the graphical model), and automatically produce either deployable software systems or descriptions of hardware systems that mimic the behavior of either the entire model or portions of the model (code generation).

Block diagrams are an example of graphical models created within a graphical modeling environment, such as a time-based block diagram, for modeling a dynamic system. A block diagram model of a dynamic system is represented schematically as a collection of nodes interconnected by lines, which represent logical connections between the nodes. Signals correspond to the time-varying quantities represented by each line connection and are assumed to have values at each time instant. Each node may represent an elemental dynamic system, and the relationships between signals and state variables are defined by sets of equations represented by the nodes. Inherent in the definition is the notion of parameters, which are the coefficients of the equations. These equations define a relationship between the input signals, output signals, state, and time, so that each line represents the input and/or output of an associated elemental dynamic system. A line emanating at one node and terminating at another signifies that the output of the first node is an input to the second node. Each distinct input or output on a node is referred to as a port. The source node of a signal writes to the signal at a given time instant when its system equations are solved. The destination node of this signal read from the signal when their system equations are being solved. Those skilled in the art will recognize that the term "nodes" does not refer exclusively to elemental dynamic systems but may also include other modeling elements that aid in readability and modularity of block diagrams.

For example, in Simulink®, an example of a time-based block diagram from The MathWorks Inc., a model of a dynamic system is a block diagram comprising a plurality of nodes, called blocks, which are interconnected by lines that represent signals. In Simulink®, each block represents a functional entity, such as an elementary dynamic system, which implements a mathematical operation, i.e., an algorithm or equation, on the data being processed by the system represented by the block diagram. Each block produces an output either continuously (a continuous block) or at specific points in time (a discrete block). The type of the block determines the relationship between a block's outputs and its inputs, states, and time. A block diagram can contain any number of instances of any type of block needed to model a system. The signals in a block diagram model represent a time-varying quantity that is updated, i.e. ready-by and written-to, by the blocks. Simulink® and other software products for modeling a dynamic system provide a graphical user interface (GUI) for building models of dynamic systems as block diagrams. Each block diagram may be built by dragging and dropping blocks provided in pre-defined blocksets or custom developed by the user.

After creation of the graphical model, such as a block diagram, representing the dynamic system, the user simulates the behavior of the system over a specified time span. The information entered into a model is used to perform the simulation and a processor solves the equations defined by the nodes in the simulated model to produce simulation results. Alternatively, the processor converts the graphical model to executable code. Automatic code generation is a process whereby software is automatically produced from a graphical model of a dynamic system. The software produced may be compiled, then executed on a digital computer, implementing the functionality specified by the model.

The solution (computation of system response) of a graphical model, such as a block diagram, is obtained by evaluating the relationship between the signals and state variables representative of a dynamic system over time, where time starts at a user-specified "start time" and ends at a user-specified "stop time". Each evaluation of these relationships is referred to as a time step. The signals in the graphical model represent quantities that change over time, and these quantities are defined for all points in time between the start and stop time during execution of the graphical model.

In Simulink® and other graphical modeling environments, the nodes, blocks or other model components used to model a dynamic system are generally either "virtual", meaning the blocks play no active role in a simulation or "nonvirtual", meaning the blocks play an active role in simulating a system represented by the graphical model. Virtual blocks are merely used to organize a graphical model graphically, while nonvirtual blocks represent elementary dynamic systems that affect the model's behavior. A virtual block is provided for graphical organizational convenience and plays no role in the definition of the system of equations described by the block diagram model. The signals of a block diagram are also generally either "virtual" or "nonvirtual".

In large graphical models, there may be an extensive set of lines that connect one section of the model to another section. Virtual blocks, such as a bus creator block and a bus selector block reduce block diagram clutter by managing groups of signals as a "bundle", known as a bus signal, to improve the readability of models. In the current state of the art, the bus signal comprises a collection of signals grouped together as a collection of logical signals, i.e., by name. The virtual bus creator blocks help bundle a number of signals together to form a single bus signal. This single bus signal then connects the two sections of the model. At the destination end of the bus signal, a virtual bus selector block helps un-bundle the individual signals so that they can be connected to other blocks.

Currently, bus signals have no specification and merely comprise a visual grouping of signals for simplifying the appearance of a block diagram or other graphical model. To simulate an operation on signals in a bus signal having different data types, the signals must be de-grouped prior to passing each signal separately through a non-virtual block representing an operation to be performed on the signal. Furthermore, in current time-based block diagrams and other graphical modeling systems, some nodes or blocks impose restrictions on the attributes of the signals they can handle, and some nodes or blocks, such as a unit-delay block in Simulink® and Stateflow blocks, do not accept bus signals, meaning that the bus signal must be decomposed before passing the signals contained therein through the blocks in the graphical model.

SUMMARY OF THE INVENTION

In one embodiment, a computer-implemented method may be provided. The computer-implemented method may include defining an input bus signal in a graphical block diagram model by associating the input bus signal with a first group of signals, at least two of the first group of signals having a different data type; defining an output bus signal in the graphical block diagram model by associating the second bus signal with a second group of signals, where each of the second group of signals corresponding to one of the first group of signals; defining an input to a non-virtual operation block in the graphical block diagram model as the input bus signal; defining an output to the non-virtual operation block in the graphical block diagram as the output bus signal; and simulating an operation performed on the input bus signal by the non-virtual operation block, where the operation is performed on each of the first group of signals and output to each of the second group of signals.

In another embodiment, a system may be provided. The system may include a memory to store a graphical block diagram model. The graphical block diagram model may include a definition of a first bus signal associated with a first signal of a first data type and a second signal of a second data type, the second data type being different than the first data type, a definition of a second bus signal associated with a third signal of the first data type and a fourth signal of the second data type, and a definition of a non-virtual operation block having the first bus signal as an input signal and the second bus signal as an output signal. The system may further include a processor to simulate an operation performed on the first bus signal by the non-virtual operation block, where the operation is performed on the first signal and the second signal and output as the third signal and the fourth signal.

In another embodiment, a computer-readable medium including instructions executed by at least one processor may be provided. The computer-readable medium may include one or more instructions to simulate a graphical block diagram model including a first signal of a first data type, a second signal of a second data type, and a non-virtual operation block; one or more instructions to define a bus signal in the graphical block diagram model by associating the bus signal with the first signal and the second signal; one or more instructions to define physical attributes of the bus signal; one or more instructions to define the bus signal as an input to the non-virtual operation block; and one or more instructions to simulate an operation performed on the bus signal by the non-virtual operation block.

In one embodiment, an apparatus may be provided. The apparatus may include means for defining an input bus signal in a graphical block diagram model by associating the input bus signal with a first group of signals, at least two of the first group of signals having a different data type; means for defining an input to a non-virtual operation block in the graphical block diagram model as the input bus signal; means for defining an output to the non-virtual operation block in the graphical block diagram as an output bus signal; and means for simulating an operation performed on the input bus signal by the non-virtual operation block, where the operation is performed on each of the first group of signals and output to each of the second group of signals.

BRIEF DESCRIPTION OF THE FIGURES

FIG. 12 shows an editor for the MATLAB block of FIG. 11.

DETAILED DESCRIPTION OF THE INVENTION

The present invention provides an improved tool for modeling, simulating, and/or analyzing dynamic systems, which is capable of specifying a virtual or non-virtual definition for a bus signal in a graphical modeling environment, such as a time-based block diagram. The present invention will be described below relative to an illustrative embodiment in a time-based block diagram, though one skilled in the art will recognize that the invention may be implemented in any suitable diagraming environment, including state-based and flow diagrams, data-flow diagrams, software diagrams and other graphical programming tools. Those skilled in the art will appreciate that the present invention may be implemented in a number of different applications and embodiments and is not specifically limited in its application to the particular embodiments depicted herein.

In an illustrative embodiment of the present invention, a modeling application in a time-based block diagram includes the ability to specify a virtual or non-virtual definition for a bus signal, and generate code for a defined bus signal independently of a graphical entity when simulating a dynamic system. For example, a user may specify physical attributes of components signals that comprise the bus signal. In an illustrative embodiment, bus signals in a time-based block diagram are formalized to make bus signals more effective, intuitive and easier to use, thereby simplifying a block diagram that implements bus signals. The ability to provide a full bus signal specification in a graphical modeling environment greatly reduces data entry, and results in more concise block diagrams.

Figure 1:
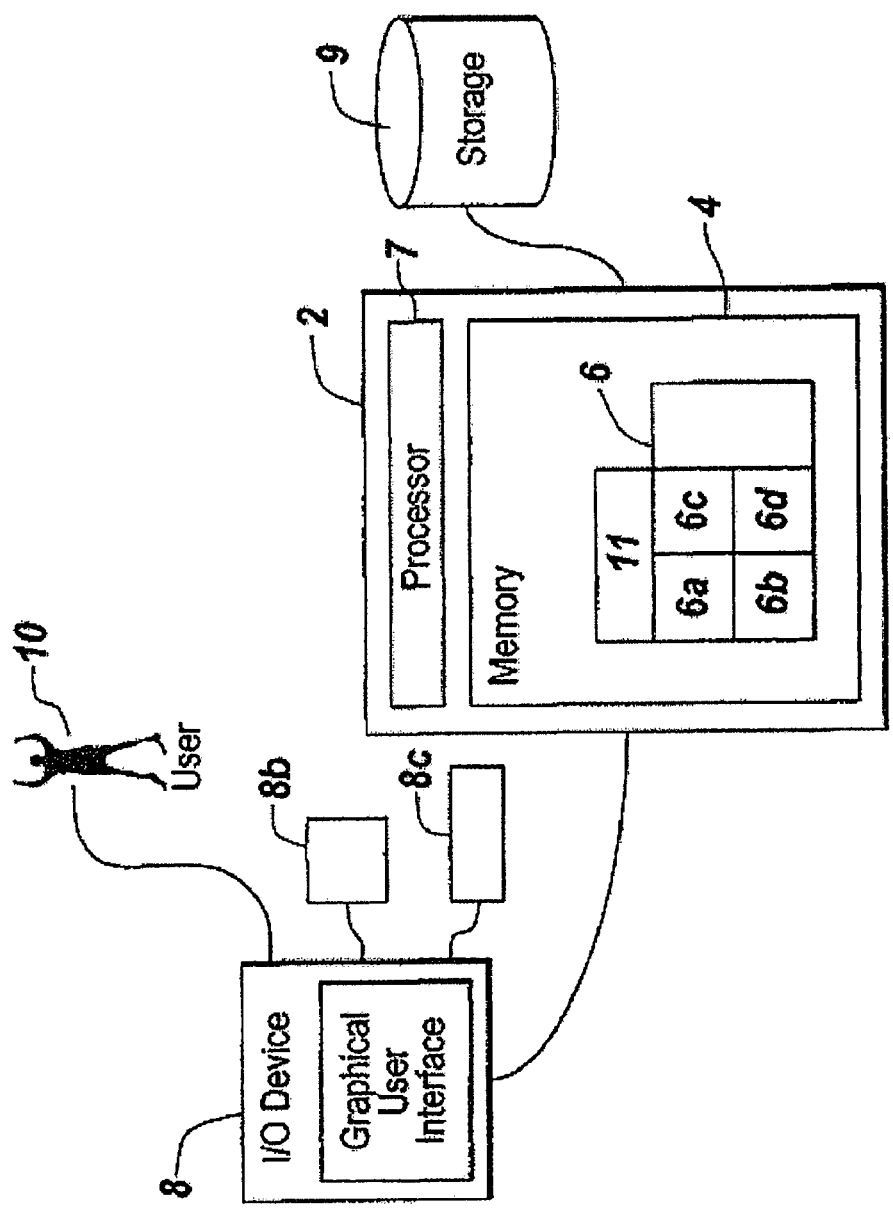
FIG. 1 illustrates an environment suitable for practicing an illustrative embodiment of the present invention.

FIG. 1 depicts an environment suitable for practicing an illustrative embodiment of the present invention. An electronic device 2 includes memory 4, on which software according to one embodiment of the present invention is stored, a processor (CPU) 7 for executing software stored in the memory, and other programs for controlling system hardware. An input/output device 8, which include a display device 8a, such as a screen displaying a graphical user interface, interfaces with the electronic device 2 to enable user interaction with the electronic device 2. The illustrative system also includes other suitable conventional I/O peripherals, such as a mouse 8b and keyboard 8c.

For example, the memory 4 holds a modeling application 6 capable of creating and simulating electronic versions of system diagrams such as block diagrams, state diagrams, signal diagrams, flow chart diagrams, sequence diagrams, UML diagrams, dataflow diagrams, circuit diagrams, ladder logic diagrams or kinematic element diagrams, which may be displayed to a user 10 via the display device 8a. Examples of suitable modeling applications include, but are not limited to MATLAB, version 6.1 with Simulink, version 5.0 from the MathWorks, LabVIEW, DasyLab and DiaDem from National Instruments Corporation, VEE from Agilent, SoftWIRE from Measurement Computing, VisSim from Visual Solutions, SystemVIEW from Elanix, WiT from Coreco, Vision Program Manager from PPT Vision, Khoros from Khoral Research, and numerous others. The memory 4 may comprise any suitable installation medium, e.g., a CD-ROM, floppy disks, or tape device; a computer system memory or random access memory such as DRAM, SRAM, EDO RAM, Rambus RAM, etc.; or a non-volatile memory such as a magnetic media, e.g., a hard drive, or optical storage. The memory may comprise other types of memory as well, or combinations thereof.

In an alternate embodiment, the electronic device 2 is also interfaced with a network, such as the Internet. Those skilled in the art will recognize that the diagrams used by the modeling application 6 may be stored either locally on the electronic device 2 or at a remote location 9 interfaced with the electronic device over a network. Similarly, the modeling application 6 may be stored on a networked server or a remote peer.

The modeling application 6 of an illustrative embodiment of the invention includes a number of generic components. Although the discussion contained herein focuses on Simulink, version 5.0 (Release 13) from The MathWorks, Inc. of, Natick Mass., those skilled in the art will recognize that the invention is applicable to other graphical modeling environments. The generic components of the illustrative modeling application 6 include a block diagram editor 6a for graphically specifying models of dynamic systems. The block diagram editor 6a allows users to perform such actions as construct, edit, display, annotate, save, and print out a graphical model, such as a block diagram, that visually and pictorially represents a dynamic system. The illustrative modeling application 6 also includes graphical entities 6b, such as signal lines and buses that represent how data is communicated between functional and non-functional units, and blocks 6c. As noted above, blocks are the fundamental mathematical elements of a classic block diagram model. A block diagram execution engine 6d, also implemented in the application, is used to process a graphical model to produce simulation results or to convert the graphical model to executable code.

In the illustrative embodiment, the modeling application 6 is implemented as a companion program to a technical computing program 11, such as MATLAB, also available from the MathWorks, Inc.

Figure 2:
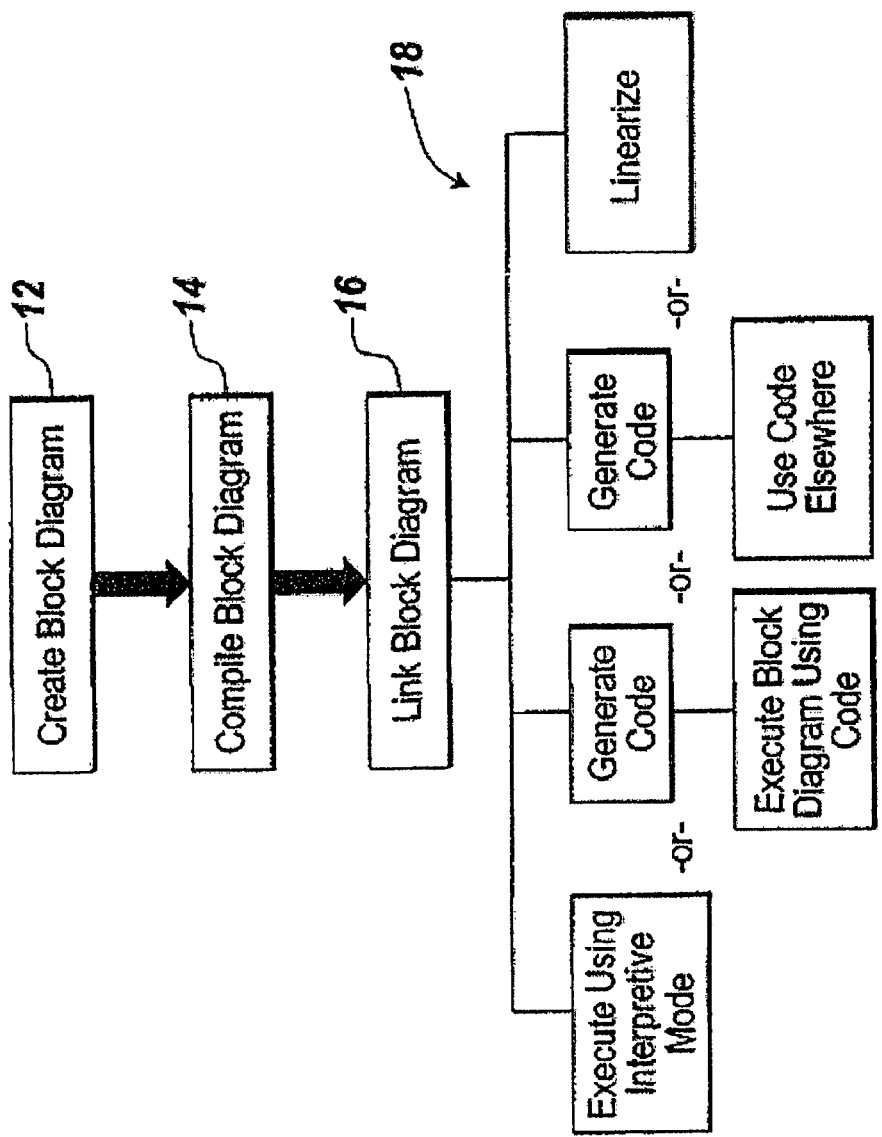
FIG. 2 is a flow chart illustrating the steps involved in simulating a dynamic system using the environment shown in FIG. 1.

FIG. 2 is a flow chart diagraming the steps involved in simulating a dynamic system according to an illustrative embodiment of the invention. In step 12, a user creates a block diagram model representing a dynamic system. After creating the block diagram model in step 12, the execution engine 6d compiles the block diagram in step 14. Then, in step 16, the execution engine links the block diagram in to produce an "in-memory executable" version of the model. In step 18, the execution engine uses the "in-memory executable" version of the model to generate code and/or simulate or linearizing a block diagram model.

The block diagram editor 6a is the graphical user interface (GUI) component that allows a user to create and modify a block diagram model representing a dynamic system, in step 12. The blocks in the electronic block diagram may model the behavior of specialized mechanical, circuit or software components, such as motors, servo-valves, power plants, filters, tires, modems, receivers and other dynamic components. The block diagram editor 6a also allows a user to create and store data relating to graphical entities 6b. In Simulink®, a textual interface with a set of commands allows interaction with the graphical editor. Using this textual interface, users may write special scripts that perform automatic editing operations on the block diagram. A user generally interacts with a set of windows that act as canvases for the model. There is generally more than one window for a model because models may be partitioned into multiple hierarchical levels through the use of subsystems.

A suite of GUI tools within the block diagram editor 6a allows users to draft a block diagram model on the corresponding windows. For example, in Simulink® the GUI tools include a block palette, a wiring line connection tool, an annotation tool, a formatting tool, an attribute editing tool, a save/load tool and a publishing tool. The block palette is a library of all the pre-defined blocks available to the user for building the block diagram. Individual users may be able to customize this palette to: (a) reorganize blocks in some custom format, (b) delete blocks they do not use, and (c) add custom blocks they have designed. The palette allows blocks to be dragged through some human-machine interface (such as a mouse or keyboard) from the palette on to the window (i.e., model canvas). The graphical version of the block that is rendered on the canvas is called the icon for the block. There may be different embodiments for the block palette including a tree-based browser view of all of the blocks.

Once a block diagram model, or other graphical model, has been constructed using the editor 6a in step 12, the execution engine 6d simulates the model by solving equations defined by the model to trace the system outputs as a function of time, in steps 14-18. The solution of the model, which may be referred to as model execution, is carried out over a user-specified time span for a set of user-specified inputs.

The compile stage in step 14 marks the start of model execution and involves preparing data structures and evaluating parameters, configuring and propagating block characteristics, determining block connectivity, and performing block reduction and block insertion. The compile stage involves checking the integrity and validity of the block interconnections in the block diagram. In this stage, the engine 6d also sorts the blocks in the block diagram into hierarchical lists that are used when creating the block method execution lists. The preparation of data structures and the evaluation of parameters create and initialize basic data-structures needed in the compile stage. For each of the blocks, a method forces the block to evaluate all of its parameters. This method is called for all blocks in the block diagram. If there are any unresolved parameters, execution errors are thrown at this point.

During the configuration and propagation of block and port/signal characteristics, the compiled attributes (such as dimensions, datatypes, complexity, or sample time) of each block (and/or ports) are setup on the basis of the corresponding functional attributes and the attributes of blocks (and/or ports) that are connected to the given block through lines. The attribute setup is performed through a process during which block functional attributes "ripple through" the block diagram from one block to the next following signal connectivity. This process (referred to herein as "propagation"), serves two purposes. In the case of a block that has explicitly specified its block (or its ports') functional attributes, propagation helps ensure that the attributes of this block are compatible with the attributes of the blocks connected to it. If not, an error is issued. For example, if an Integrator block is implemented to only accept numbers of double precision datatype, then this block will error out if it is driven by a block that produces single precision data, unless the user has asked for an implicit data conversion. Secondly, in many cases blocks are implemented to be compatible with a wide range of attributes. Such blocks adapt their behavior in accordance with the attributes of the blocks connected to them. This is akin to the concept of polymorphism in object-oriented programming languages. For instance, a discrete-time Filter block could be implemented to accept any of the standard integer datatypes ranging from 8-bit to 128-bit. The exact implementation of the block is chosen on the basis of the specific block diagram in which this block finds itself. Included within this step are other aspects such as validating that all rate-transitions within the model yield deterministic results and that the appropriate rate transition blocks are being used.

The compilation step also determines actual block connectivity. Virtual blocks play no semantic role in the execution of a block diagram. During compilation, the virtual blocks and signals, such as virtual bus signals, in the block diagram are optimized away (removed) and the remaining non-virtual blocks are reconnected to each other appropriately. This compiled version of the block diagram with actual block connections is used from this point forward in the execution process Once actual block connectivity has been determined (by removing the virtual blocks) the block diagram may be further optimized by performing block reduction and insertion. During this step, blocks may be inserted or a set of non-virtual blocks may be completely removed or reduced to a single equivalent block. Block insertion and reduction is mainly done to improve execution efficiency.

In the link stage, in step 16, the execution engine 6d uses the result of the compilation stage to allocate memory needed for the execution of the various components of the block diagram. The linking stage also produces block method execution lists which are used by the simulation or linearization of the block diagram. Included within the link stage is the initialization of the model which consists of evaluating "setup" methods (e.g. block start, initialize, enable, and constant output methods). The block method execution lists are generated because the simulation and/or linearization of a model must execute block methods by type (not by block) when they have a sample hit.

The compiled and linked version of the block diagram may be directly utilized to execute the model over the desired time-span, in step 18. According to one aspect, after linking has been performed, the execution engine 6d may generate code in step 18 to produce software from the block diagram. In this stage, the execution engine may choose to translate the block diagram model (or portions of it) into either software modules or hardware descriptions (broadly termed code). If this stage is performed, then the stages that follow use the generated code during the execution of the block diagram. Alternatively, the execution engine skips generating code in step 18 and uses an interpretive mode of execution for the block diagram. In another embodiment, the execution engine 6d only generates code in step 18. For example, a user may not proceed further with the execution of the block diagram because he would like to deploy the code outside the confines of the block diagram software.

Upon reaching the simulation stage, the execution engine 6d uses a simulation loop to execute block methods in a pre-defined ordering upon a sample hit to produce the system responses they change with time.

To perform a linearization in step 18, Simulink uses the block method execution lists in a prescribed fashion to produce a linear state space representation of the dynamic system described by the block diagram.

Figure 3:
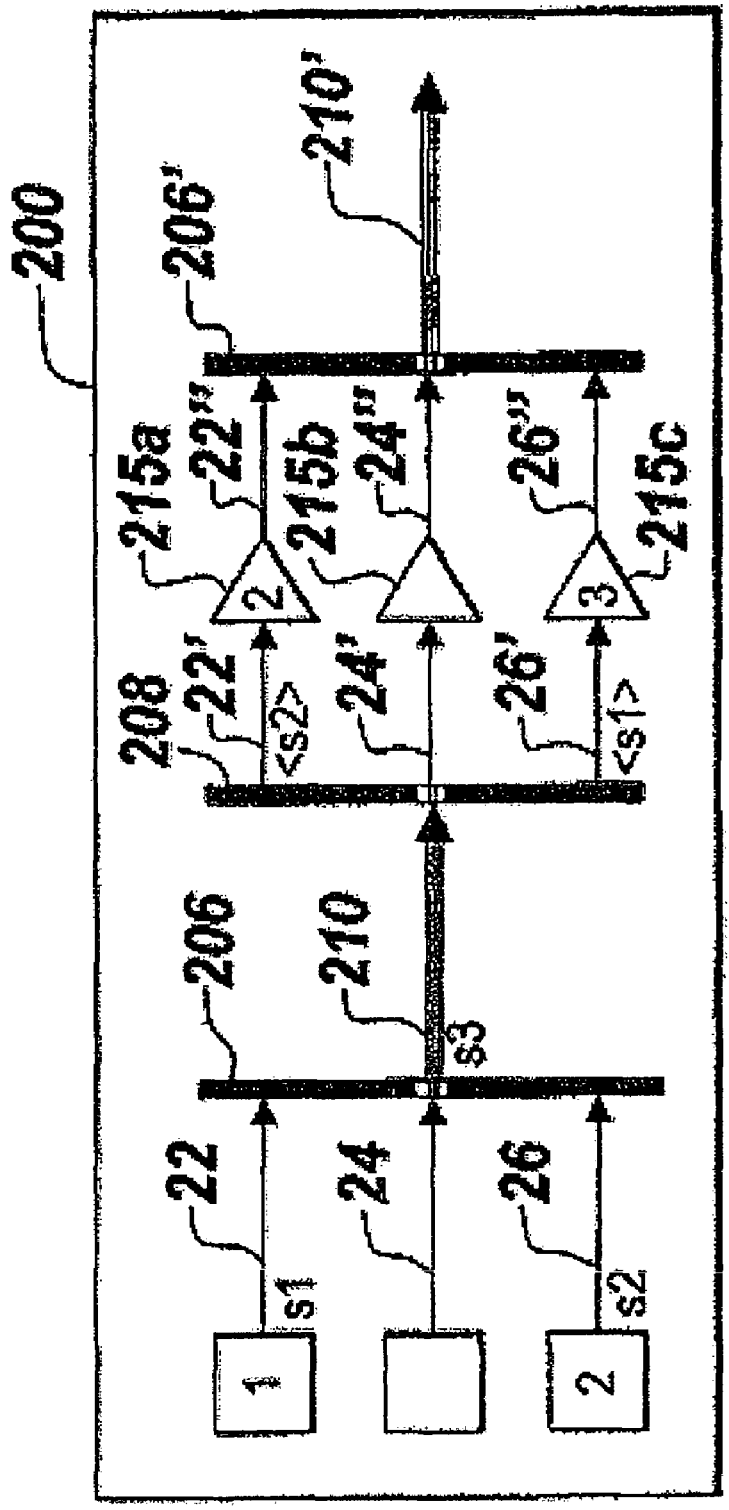
FIG. 3 illustrates a block diagram of the prior art including a virtual bus creator block and a bus selector block.

FIG. 3 illustrates a block diagram 200 displayed on a GUI and created in a time-based block diagram of the prior art, including a virtual bus creator block and a bus selector block, which may be used to simplify the appearance of the block diagram 200. In large models, there may be an extensive set of lines, such as signals 22, 24, 26, that connect one section of a block diagram 200 to another section. To avoid excessive clutter of lines and improve readability, the bus creator block 206 is used to bundle together a plurality of component signals in the block diagram to form a single bus signal 210. The single bus signal 210 then connects the two sections of the model 200. At the destination end of the bus signal 210, a bus selector block 208 helps un-bundle the component signals 22, 24 and 26 so that each individual component signal 22, 24 or 26 can be connected to other blocks. As shown, in the current state of the art, bus signals, created using bus creator blocks and bus selector blocks, are useful for visually organizing and simplifying a block diagram.

When creating a block diagram, to bundle a group of signals into a bus signal with a bus creator block 206, a user first specifies the number of input ports on the bus creator block in a bus creator block parameter dialog box (provided as a GUI), which indicates the number of signals to group together to form the bus signal. Then, in the block diagram window, the user connects the signals to be grouped to the resulting input ports, and connects any type of signal to the inputs. The bus creator block assigns a name to each signal on the bus. The bus selector block, which ungroups a bus signal, accepts input from a bus creator block or another bus selector block. The bus selector has one input and multiple output ports, depending on the number of signals to be de-grouped.

Figure 4:
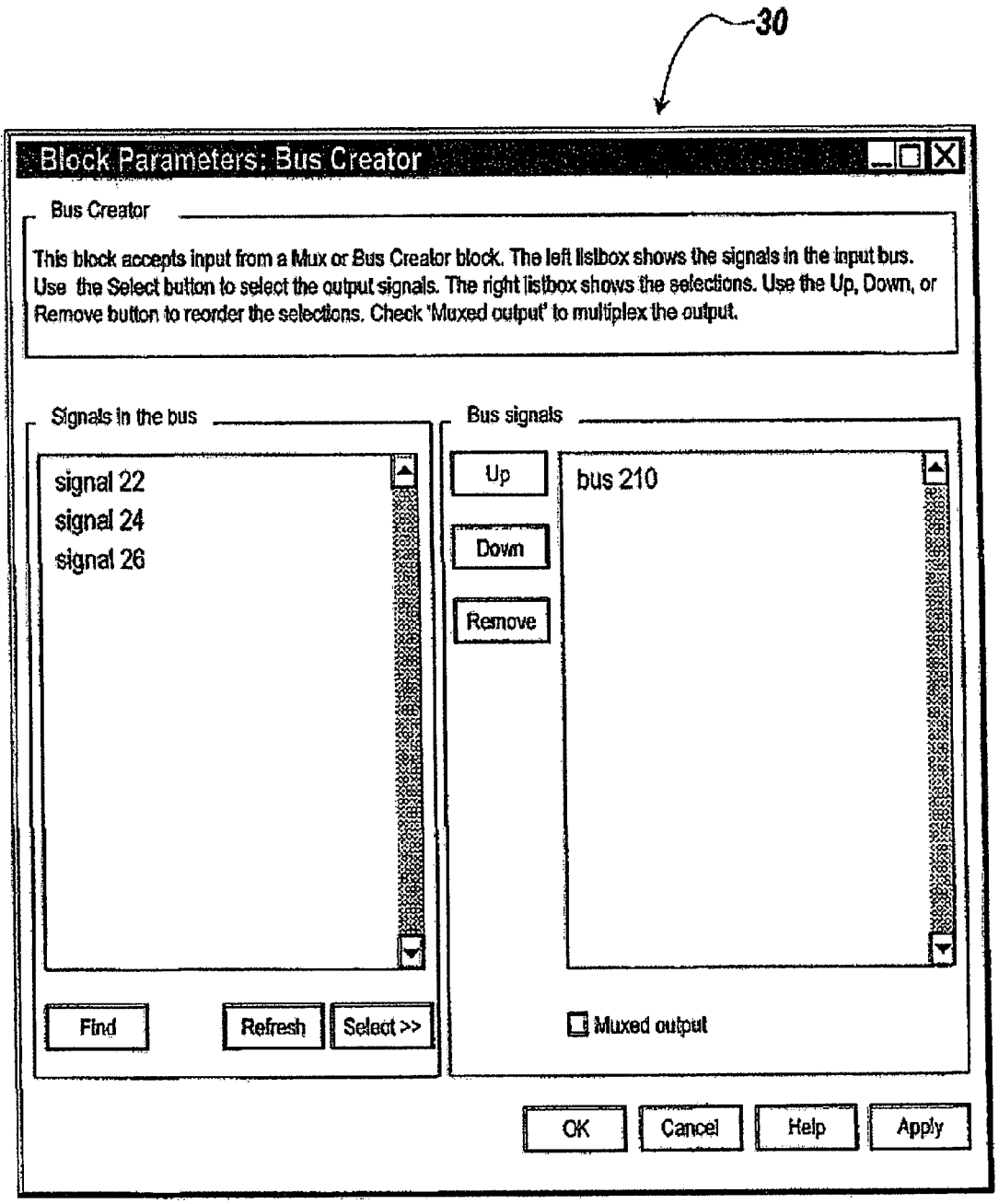
FIG. 4 illustrates a bus selector dialog box of the current state of the art for creating a bus signal.

FIG. 4 illustrates a bus creator dialog box 30 of the current state of the art for creating a bus signal. As shown, the bus creator dialog box only specifies the names of the component signals 22, 24, 26 that are grouped together to form a bus signal 210, but does not provide additional definition to the bus signal. A bus selector dialog box, used to ungroup a bus signal, also does no more than specify the names of the signals to be de-grouped from the bus signal.

A significant drawback to the implementation of bus signals as virtual signals in current time-based block diagram and other graphical modeling environments is that bus signals are purely graphical entities and have no mathematical or physical significance. These virtual bus signals are ignored when simulating a model. During simulation, the execution engine 6d determines the nonvirtual signals represented by a bus signal, using a procedure known as "signal propagation". Signal propagation continues until all nonvirtual components of a virtual bus signal have been determined. When running a model, the execution engine 6d uses the corresponding non-virtual signals, determined during signal propagation, to drive the blocks to which the virtual signals are connected. In the current state of the art, bus signals lack a well-defined specification, and certain key blocks do not accept bus signals.

Another key limitation to current systems is that the modeling program 6 can only perform a non-virtual operation on a bus signal in a graphical model if the data signals comprising the bus signal are of the same data type. For example, as shown in FIG. 3, in order to pass signals representing different signal types through non-virtual blocks, i.e., to model and simulate an operation on the data represented by each signal, the bus signal must be decomposed to ungroup the data signals from each other using the bus selector block. The bus signal 210 must be broken down into the different component signals 22, 24 and 26 prior to passing each signals separately through an associated non-virtual block 215a, 215b, 215c representing the operation. After modeling the operation, the output signals 22", 24", 26" from the non-virtual blocks 215a, 215b, 215c, respectively are again grouped into a bus signal 210' using another bus creator block 206'.

Figure 5:
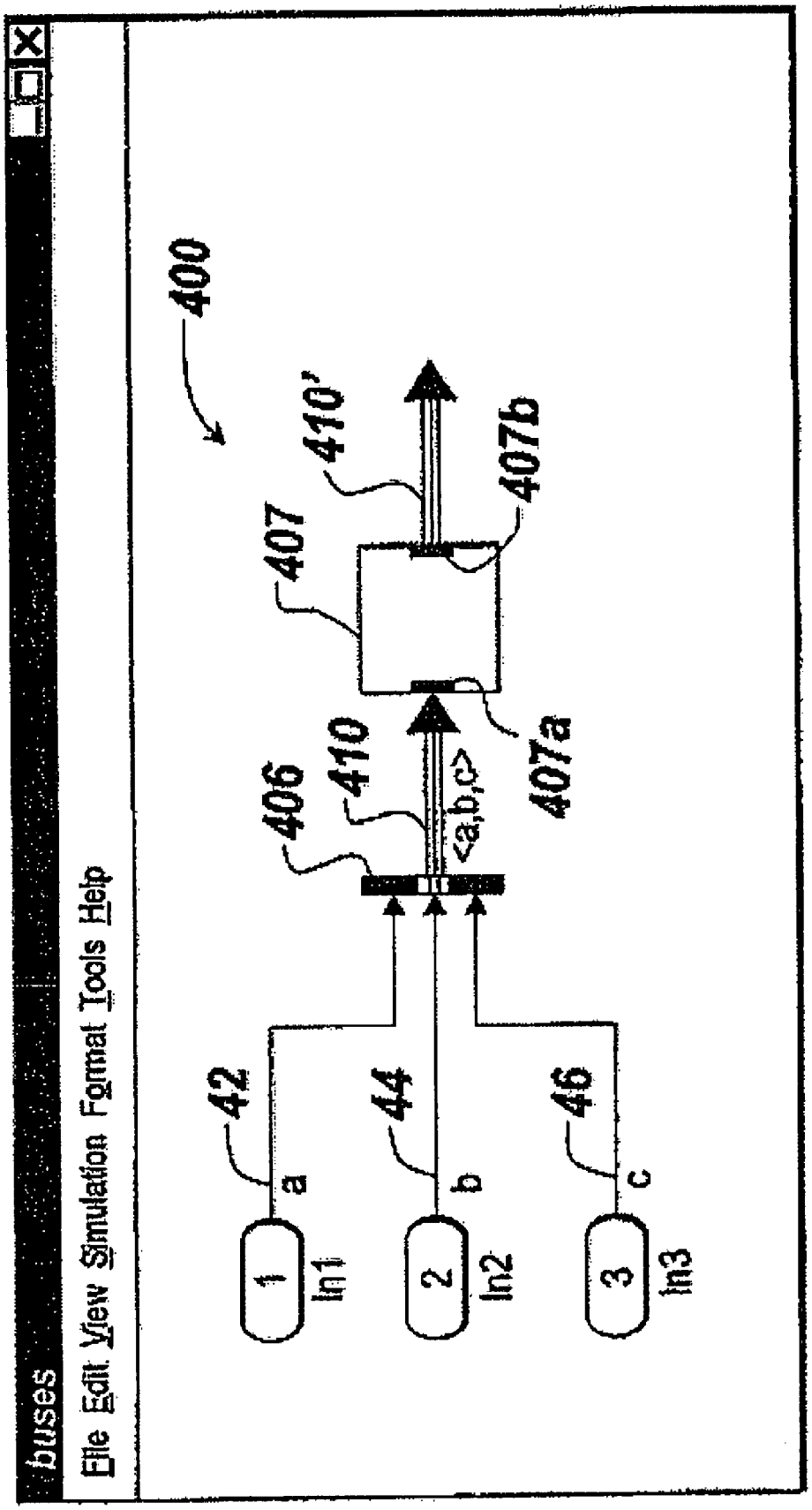
FIG. 5 illustrates a block diagram including bus signals according to an illustrative embodiment of the invention.

An illustrative embodiment of the present invention extends the capabilities of previous simulations systems by providing the ability to model and simulate a non-virtual operation on bus signals comprising signals of different signal types without having to de-group the bus signal within a graphical model, such as a block diagram, as shown in FIG. 5. The illustrative embodiment of the invention allows bus signals to connect directly to non-virtual blocks in a block diagram 400 to model an operation to be simulated on the data signals comprising the bus signals. For example, as shown in FIG. 5, a user may generate a bus signal 410 comprising a plurality of signals 42, 44 and 46 having different signal types using a bus creator block 406. The bus signal 410 may comprise a variety of different signal types, for example signals having attributes with different data types, different data complexities, and so on. As used herein, the term "signal type" refers to a set of attributes of a signal. The term "data type" is known in the art and refers to an internal representation of data on a computer system, as well as any additional semantics relating to the data. Examples of possible data types are Boolean, 16-bit integers, fixed-point, double, and so on. These examples are intended to be illustrative and not limiting of the present invention. The illustrative bus signal 410 comprises an integer signal (a first signal type) 42, double signal 44 (a second signal type) and a double signal 46 (the second signal type), respectively. Without decomposing the bus signal 410, the bus signal 410 "passes through" a non-virtual block 407 in the block diagram 400. The non-virtual block 407 represents an operation to be performed on the signal values represented by all of the signals 42, 44 and 46 within the bus signal 410, to simulate a non-virtual operation on all of the signals contained within the bus signal 410 without requiring a separate operation block for each component signal. Examples of non-virtual operations include, but are not limited to multiplication using a "Gain" block, integration using an "Integrator" block, calculating a derivative of an input using a "Derivative" block, delaying an input using a "Delay" block, and many others known in the art or created by the user. Other operations that can be represented by blocks in Simulink® include division, a linear transfer function, a transfer function specified in terms of poles and zeros, a dead zone function, a switching function, a quantizing function and a rate limiting function. The bus signal may comprise a number of component signals of different signal types. During code generation, the execution engine automatically maps the portion of the block diagram containing the bus signal 410, without requiring input from the user.

As shown in FIG. 5, the bus signal 410 in the block diagram is made to "pass through" the block 407, which represents non-virtual operation to be performed on the component signals, by connecting the bus signal 410 to an input port 407a or inlet of the block 407. The connection of the bus signal to the input port signifies that the values of the component signals are to be passed as inputs to the operation represented by the block 407. The output bus signal 410' comprises modified component signals, which represent the outputs of the non-virtual operations on the values represented by each of the input component signals. The modified bus signal 410' connects to the output port 407b of the block 407.

In one embodiment of the present invention, the structure of the bus signal is preserved as the bus signal 410 passes through the non-virtual block 407. For example, when passing a bus signal through a Delay block, the form of the bus signal 410' at the output of the delay block matches the form of the bus signal 410 at the input to the delay block, where "form" is understood to encompass characteristics such as data type, complexity and so on.

As shown, a user is not required to ungroup signals in a bus signal to perform an operation by passing each signal individually through a separate block representing the operation, then regroup the signals into another bus signal after passing each signal separately through an operator block. Thus, the ability to pass bus signals through non-virtual blocks in a block diagram provides a more concise and simplified block diagram that can be more easily constructed and understood, as shown by comparing the block diagram 200 of FIG. 3 with the block diagram 400 of FIG. 5. The ability to pass a bus signal through key blocks also accelerates data entry by eliminating unnecessary steps of creating and degrouping bus signals, for example, as required in the diagram of FIG. 3.

In another aspect of the present invention, certain key blocks and nodes in the time-based block diagram that have been previously incapable of accepting bus signals, are now configured to accept bus signals. Examples included, but are not limited to a Zero-Order-Hold block, which implements a zero-order hold on all signals within an input bus signal 410 for one sample period, a Delay block which delays an all signals within an input bus signal 410 by one sample period, a Merge block, which combines input signals into a single memory location, a Switch block and a Multiport Switch block. According to an illustrative embodiment of the invention, a bus signal can be directly connected to any of these blocks, and the execution engine, during simulation automatically maps that portion of the block diagram without requiring additional input from the user. As a result, the block diagram is simplified, by not requiring a user to de-group the bus signal and pass the individual component signals through a separate block in order to model the operation represented by the block on all of the signals. The modeling application further enables bus signals to pass through subsystems, which represent a system within another system, and other domains, such as Stateflow, which is an example of a tool used to specify any combination of finite state machines, flow diagrams, statecharts, truth tables, or textual functions.

According to another aspect of the invention, the modeling application 6 includes the ability to provide a definition to a bus signal, specifying that it have a nonvirtual implementation. For example, in an illustrative embodiment, a user can define physical attributes of the non-virtual component signals of a bus signal. As described above, bus signals in prior time-based block diagrams have no physical aspects, and have been merely used during construction of a graphical model of a dynamic system, such as a block diagram, to simplify the appearance of graphical model. During simulation, bus signals in prior systems are ignored as merely ornamental components lacking mathematical significant, and code was not generated during simulation to represent a bus signal. In one embodiment, the present invention provides the ability to specify a non-virtual implementation for a bus signal, and generate code for the bus signal independently of other components of the block diagram, such as the source signals that comprise the bus signal.

Figure 6:
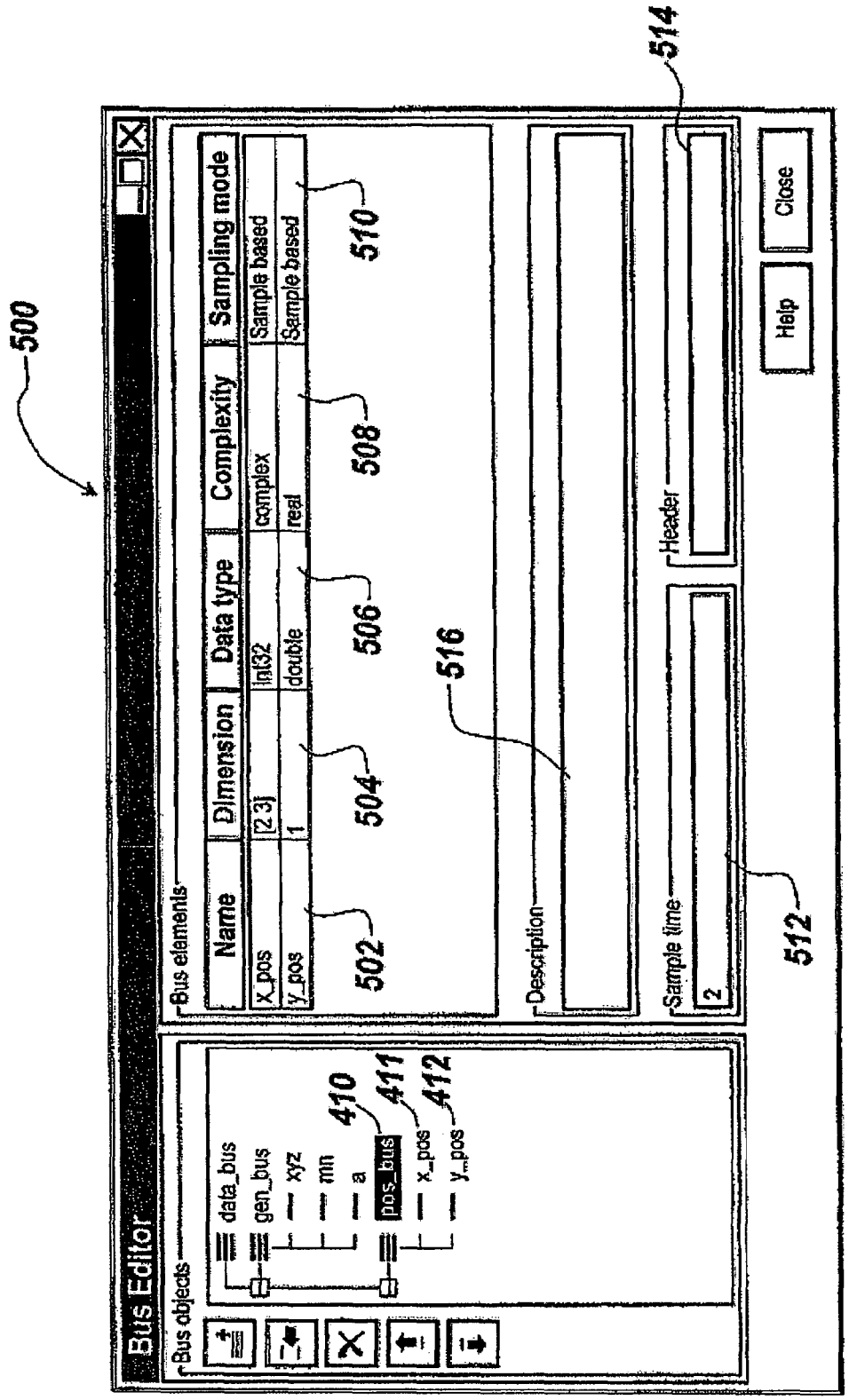
FIG. 6 illustrates a bus specification editor for providing a definition for a bus signal in a graphical modeling environment according to an illustrative embodiment of the invention.

FIG. 6 illustrates a GUI displaying a bus specification editor 500 that may be used to provide a definition for a bus signal in a time-based block diagram according to an illustrative embodiment of the invention. The bus specification editor 500 allows a user to define certain properties of a bus signal, such as the characteristics of the components of the bus signal. One skilled in the art will recognize that the invention is not limited to the illustrative embodiment, and that any suitable mechanism for providing a definition to a virtual or non-virtual bus signal may be used in accordance with the teachings of the present invention.

In the embodiment shown in FIG. 6, the bus specification editor 500 includes a plurality of fields for entering a definition that specifies physical attributes for components of a bus signal, though one skilled in the art will recognize that the invention is not limited to the illustrated mechanism for specifying a bus signal. In the illustrative embodiment, characteristics for the bus signal 410 that may be defined include, but are not limited to: the name of the elements comprising the bus signal, the dimension of the elements, i.e., whether each signal is a matrix, vector or scalar value, the signal type, for example a data type of an attribute of the components signals, such as whether a signal is integer, double, Boolean, and so forth, the complexity of each element and the sampling mode for each element. As shown, the bus specification editor 500 includes a name field 502 to allow a user to define the name of the component signals comprising the bus signal 410 and specify the number of component signals in the bus signal. The illustrative bus specification editor 500 includes a dimension field 504 to allow a user to define the dimensionality of the signals comprising the bus signal. As used herein, a dimension of a signal refers to whether the signal is vector (one-dimension), a matrix (2-dimensions) and so on. In Simulink®, a one-dimensional (1-D) signal generally consists of a stream of one-dimensional arrays output at a frequency of one array (vector) per simulation time step. A two-dimensional signal consists of a stream of two-dimensional arrays emitted at a frequency of one 2-D array (matrix) per block sample time. A one-element array is frequently referred to as a "scalar". A row vector is a 2-D array that has one row. A column vector is a 2-D array that has one column. The signal type field 506 also allows a user to specify the signal type of the signals comprising the bus signal, for example, specifying a data type of the attributes of the signal. As used herein, "data type" refers to an internal representation of data on a computer system, as well as any additional semantics relating to the data. Examples of possible data types are Boolean, 16-bit integers, fixed-point, double, and so on. A complexity field 508 allows a user to specify the complexity the signals comprising the bus signal, i.e., whether the values comprising each signal are complex or real numbers. A complex signal is a signal whose values are complex numbers, while a real signal has values that are real. A sampling mode field 510 enables specification of the sampling mode of each of the elements in the bus signal. A sample time field 512 allows a user to specify a sample rate for the bus signal. A header field 514 allows a user to define a header for the bus signal, to represent the type definition for the signal in the generated C code, and a description field 516 allows a user to input a description for the bus signal. One skilled in the art will recognize that the bus specification editor is not limited to the illustrative embodiment and that any suitable mechanism for defining one or more attributes of a bus signal in a modeling application may be used in accordance with the teachings of the invention.

One skilled in the art will recognize that the ability to provide a definition for a bus signal is not limited to nonvirtual bus signals. For example, a definition may also be provided for a virtual bus signal using a bus specification editor. A bus definition can be used to specify characteristics of the components of the bus, independent of whether the bus has a virtual or nonvirtual implementation.

In the embodiment illustrated in FIG. 6, a bus signal 410 named "pos_bus" is specified. The pos_bus bus signal includes a first signal 411 named "x_pos" which is a matrix (2-dimensional), the data type is integer, the values are complex numbers and the sampling mode is sample based. The second signal 412 in the pos_bus bus signal is named "y_bus" and has one dimension, a double type value and is a real number. The characteristics of a particular bus signal are input and defined by a user using the illustrative bus specification editor or other suitable tool.

After a definition is provided for a bus signal, as described above, the execution engine 6d may generate code for the bus signal having a nonvirtual implementation as a standalone definition, independently of the normal code generation process for the block diagram. According to the illustrative embodiment, stand-alone code for a bus signal is generated using the definition for the bus signal when the definition is complete.

According to an illustrative embodiment of the invention, a bus specification, which is defined using the bus specification editor 500, can be weak, having only the names of the component signals defined, or strong, including a full definition for all elements of the bus signal, for example, fully-specified names, data types, widths, complexity, and so on. The bus specification may also be partial, consisting of a partial definition, for example, names and complexities are specified, but datatypes and widths are not. In addition, users have the ability to specify a bus to be virtual or non-virtual (e.g., an interface for code generation).

In an illustrative embodiment of the present invention, enhancing bus signals to have a definition that may be determined and entered by a user allows the user to define system interfaces, leading to more robust, structured designs.

A bus signal specification may be created within a block diagram model or independently of a model, using a user-defined data (UDD) class based approach. A specification for a bus signal, which may be defined using a bus specification editor, as described above, may be saved in a bus library within the diagraming program and called by the user when needed, in a process similar to the manner in which blocks are called from a block library to build a block diagram. The specification for a bus signal may be saved with an associated block diagram model that implements the bus signal. Alternatively, a bus specification may be saved independently of a block diagram model and subsequently associated with a block diagram model during construction of the block diagram.

According to another aspect of the present invention, a bus signal having a defined specification, as described above, may have multiple variants when implemented in the generated code, i.e., when the block diagram including the bus signal is converted to code by the execution engine 6*d*. The ability to have "implementation variants" of a bus signal in a graphical modeling environment such as a time-based block diagram i.e., more than one implementation specification per logical specification, allows the same logical bus signal to be accessed in several different contexts, where each access has an optimal representation in the generated code. Allowing multiple implementations for a bus specification allows for highly efficient generated code.

Depending on the particular application, the present invention provides various methods of implementing a bus signal in generated code during simulation of a dynamic system represented by a block diagram or other graphical model including the bus signal. According to an illustrative embodiment, the present invention may provide five different methods of implementing a bus signal. For example, a bus signal can be passed to a function in the generated code as a structure, passed by reference. Alternatively, a bus signal may be passed to a function in the generated code as a global structure, referenced statically as global. According to another aspect, individual elements of a bus signal may be passed to a function as formal parameters, by value. In yet another implementation, each element of a bus signal may be passed as an individual piece of unstructured data. In an automatic mode, the execution engine automatically calculates and determines which method to employ when implementing the bus signal.

How efficiently a bus signal is passed to and from a system, i.e., a function in the generated code, differs depending on the particular situation. According to an illustrative embodiment, the particular implementation of a bus signal in the generated code corresponds to different levels in the model hierarchy.

The application of an illustrative embodiment of the invention provides mechanisms whereby the user can choose which implementation method to utilize. For example, during creation of a bus signal, a user can specify whether or not the created bus signal is virtual or nonvirtual, and, if nonvirtual, the bus signal properties can be edited to utilize either a local or global structure. According to a preferred embodiment, the bus argument passing mechanism may be specifiable by the user in the bus editor interface, such as the bus specification editor 500 shown in FIG. 6.

According to another aspect of the present invention, the modeling application 6 implements checks to enforce a particular bus type during construction and simulation of a model. The bus specification may include methods for performing static and dynamic checks. For example, for each component signal within the bus signal, the user can specify constraints using the bus specification editor 500, during creation of a block diagram in step 12 as shown with respect to FIG. 2. After specifying constraints for each signal within a bus signal, as described above, the execution engine 6*d* may perform a static check prior to step 14 to validate certain constraints prior to simulation during an attribute propagation stage. According to another aspect, the execution engine 6*d* performs a dynamic check during step 18, which validates the constraints during simulation of the block diagram. The checks may be used to enforce a specified bus type or definition on a subsystem input or output or to specify a range for subsystem inputs. The ability to perform constraint checking during creation and execution of a block diagram leads to safer designs.

For example, according to one aspect, an input block of a subsystem receiving a bus signal specifies an acceptable variant of a bus signal. The constraint check implemented by the execution engine of an illustrative embodiment of the invention thus ensures that only bus signals having the specified format are passed to that subsystem. If a user attempts to pass a bus signal having a different format than the specified format, the execution engine 6*d* raises an error, either during an attribution propagation stage (a static check) or during simulation (a dynamic check).

Figure 7:
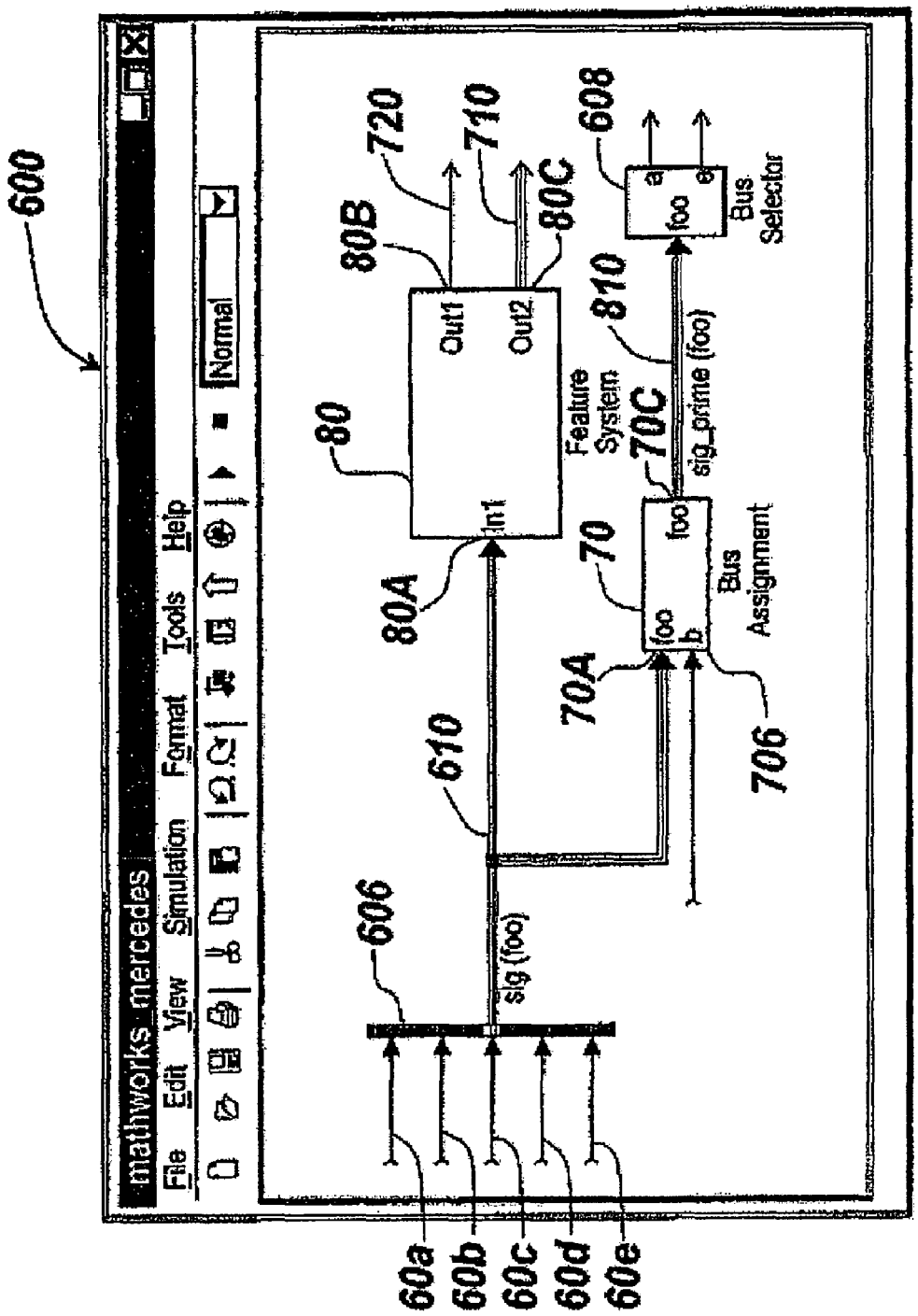
FIG. 7 illustrates a block diagram model implementing enhanced bus signals according to an illustrative embodiment of the invention.

The ability to provide a definition for a bus signal and generate code for a bus signal enables creation of concise diagrams, while significantly reducing data entry. An example of a block diagram model 600 implementing the improved bus signals according to an illustrative embodiment of the invention is shown in FIG. 7. As shown, component signals 60*a*, 60*b*, 60*c*, 60*d* and 60*e* are grouped together using a bus creator block 606 to reduce the number of lines in the model. The illustrative bus creator block 606 has an optional user defined data class specification. As shown, the bus creator block 606 combines the signals 60*a*, 60*b*, 60*c*, 60*d* and 60*e* to form a bus signal 610 named "sig" of type "foo", as defined, for example, in an bus editor interface. The bus signal 610 connects to a subsystem 80 via an input port 80*a*. The subsystem 80 represents an operation to be performed on the values represented by the component signals of the bus signal 610. As shown, the subsystem 80 is configured to accept signals of type "foo", i.e., the same type as the bus signal 610. The subsystem 80 performs a check to ensure that the bus signal 610 is of the appropriate type. The subsystem, depending on its specifications, outputs a first output 720 via output port 80*b* and a second output 710, which may be a bus signal, via output port 80*c* as illustrated in FIG. 7. The bus signal 610 also branches off and passes to an Assignment block 70 via an input port 70*a*. The Assignment block 70 assigns a value, via port 70*b*, to a specified element (signal 60*b*) of the bus signal 610, without needing to decompose and reconstruct the bus signal 610. The Assignment block has an output port 70c which connects to a bus signal 810, which represents the output of the block. The bus signal 810 is called "sig_prime" of and is also of type "foo". As shown, the Assignment block 70 preserves the structure of the bus signal while assigning a value to one or more elements of the signal. The output bus signal 810 passes to a bus selector block 608, which degroups signals 60a and 60e from the bus signal 810.

Figure 8:
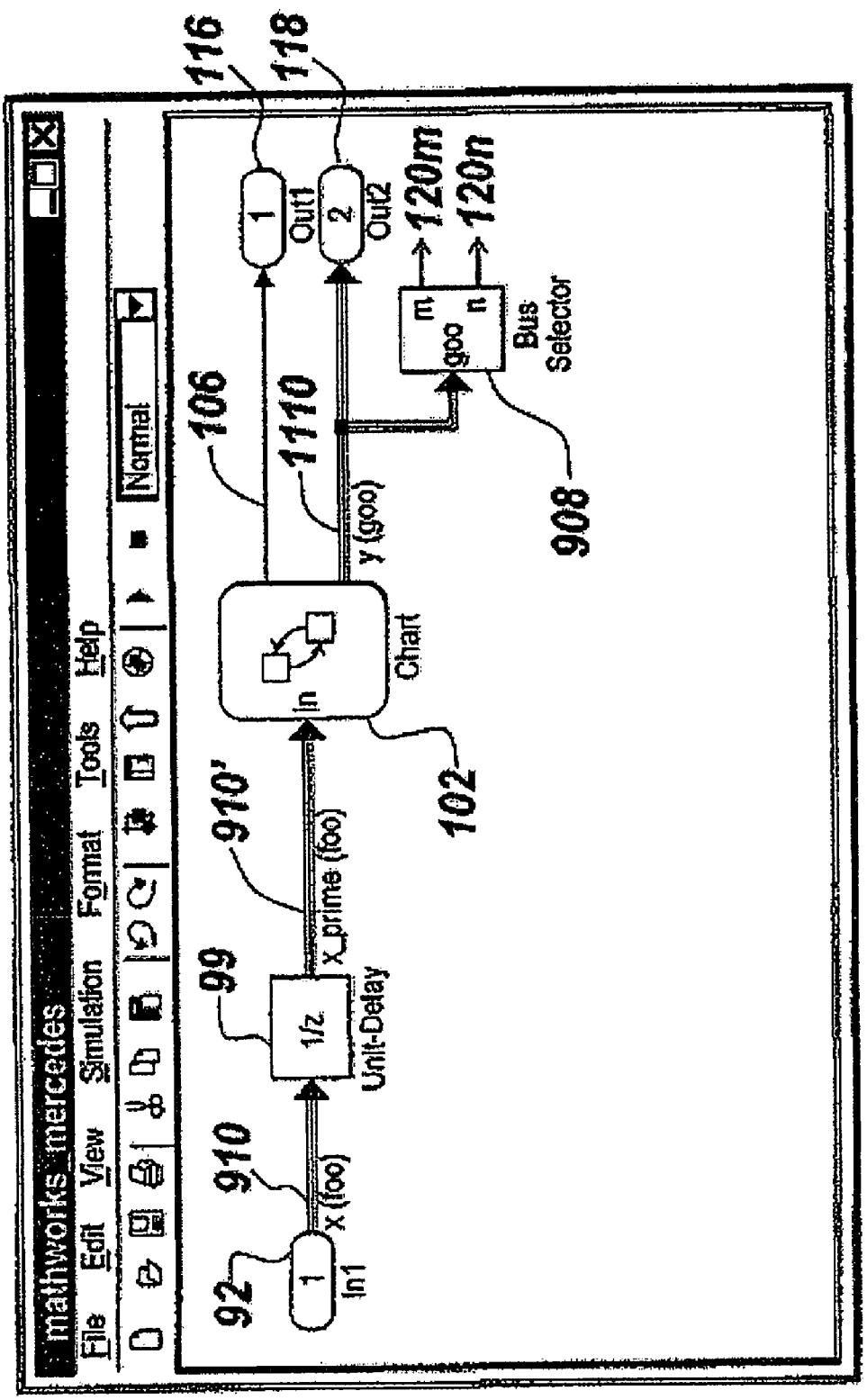
FIG. 8 illustrates another block diagram model implementing the enhanced bus signal capabilities according to an embodiment of the present invention.

FIG. 8 illustrates another block diagram model 700 implementing the enhanced bus signal capabilities according to an embodiment of the present invention. As shown, from an input block "In1" 92 is a bus signal 910 named "x" having a bus type that is specified as "foo". Similar to current data type propagation, an error is reported unless the input bus signal is of type "foo". In a bus specification editor for the bus signal, user may optionally configure the input bus signal 910 to be non-virtual, i.e, a structure implementation. The system performs static and dynamic checks on the input bus signal 910 to ensure that the signal is of the appropriate type. A block, illustrated as a unit delay block 99, accepts the bus signal 910 and outputs a bus signal 910' "x_prime" of the same type as the input bus signal 94. The bus signal 910' output from the block 99 may be virtual or non-virtual, depending on a specification. A unit delay block 99, as shown in FIG. 8, delays an input signal by one sample period. One skilled in the art will recognize that the unit delay block is illustrative of an embodiment of the invention, and that any suitable block for representing a function to be performed on values represented by a bus signal may be used. A Stateflow block 102 is configured to accept a bus signal of type "foo" from the block 99 and output a scalar "out" signal 106 and a bus signal "y" 1110 of type "goo". The scalar out signal 106 passes to an output port 116 and the bus signal 1110 passes to an output port 118. The system raises an error of there are problematic connections with the input and output buses. For example, if the bus signal 910' is of type "goo" rather than "foo", the Stateflow block 102 will not accept the signal as an input. Prior to passing to the output port 118, the bus signal 1110 branches, and one branch passes to a bus selector block 908. The bus selector block 908 decomposes the output bus signal 1110 into signals two signals 120m and 120n, and passes the degrouped signals 120m, 120n to additional blocks (not shown).

Figure 9:
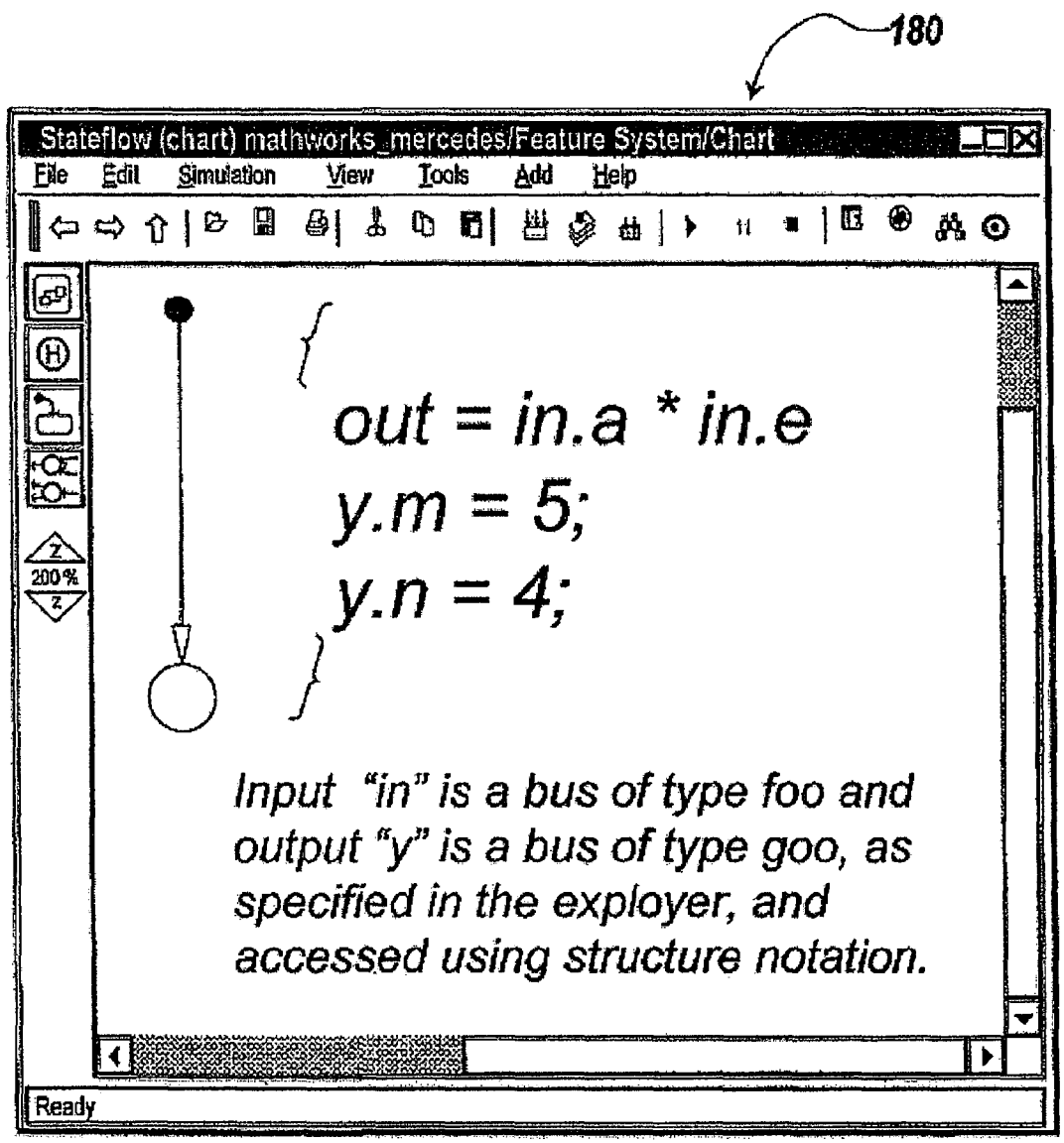
FIG. 9 illustrates a Stateflow diagram, which accesses a bus signal from a Simulink domain according to an illustrative embodiment of the invention.

As shown in FIG. 9, which illustrates a Stateflow diagram 180 displayed on a graphical user interface, a Stateflow action language, which is text-based, can access elements of the bus signal 910' of FIG. 8 directly. As defined in the Stateflow diagram 180 by the Stateflow action language, the output signal 106 of the Stateflow block 102 equals the product of two component signals of the input bus signal 910' of type "foo". The Stateflow diagram 180 also defines the output bus signal "y" 1110 as a bus signal of type "goo" with components "m" and "n" being 5 and 4, respectively.

Figure 10A:
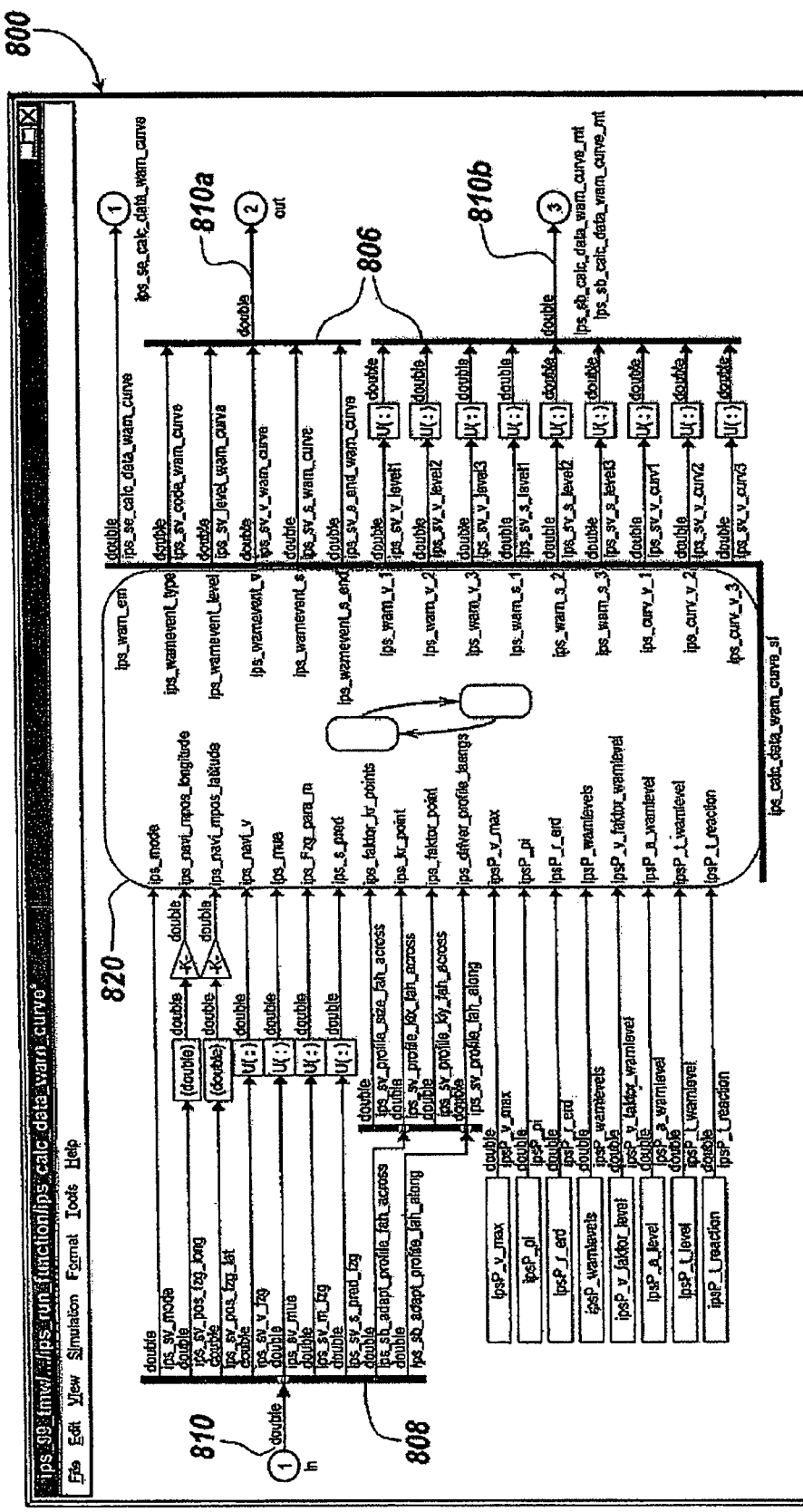
FIG. 10A illustrates a block diagram of the prior art, including a Stateflow chart as a subsystem.
Figure 10B:
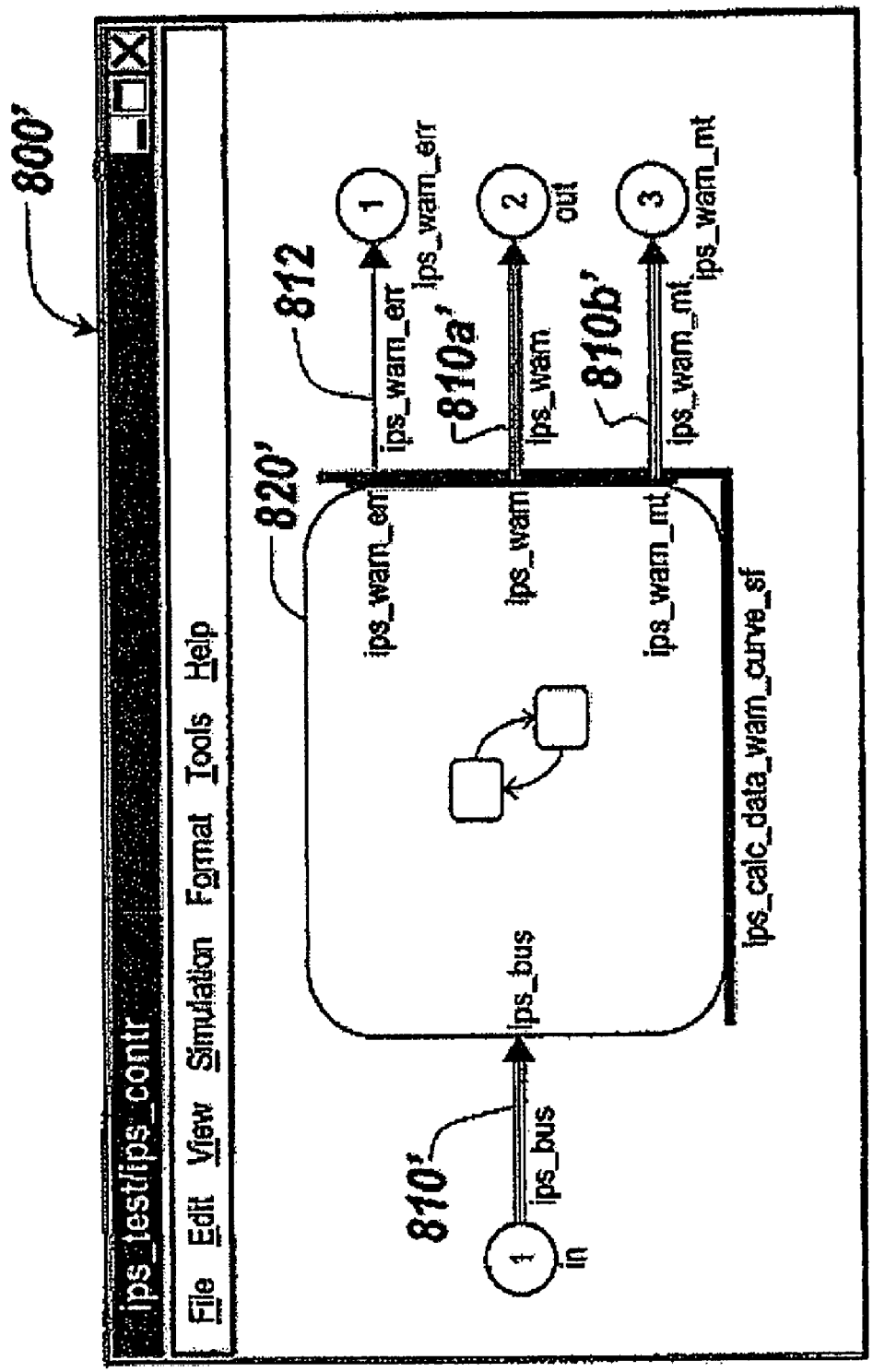
FIG. 10B illustrates a block diagram including a Stateflow chart according to an illustrative embodiment of the invention.

As shown in FIGS. 10A and 10B bus signals may also be passed from a first domain to a second domain without degrouping or varying the structure of the bus signal. Examples of different domains in the current state of the art include, but are not limited to: Simulink®, Stateflow, and Embedded MATLAB. For example, in the illustrative embodiment, Simulink® represents a time-based block diagram domain for modeling time-varying signals, and Stateflow represents a state-based diagram domain for modeling event driven modal logic. FIG. 10A illustrates a block diagram 800 of the prior art, where a subsystem in a second domain, such as a Stateflow chart 820, is incapable of accepting and operating on a bus signal originating in a different domain. Stateflow is an interactive design tool for modeling and simulating event-driven systems, available from The MathWorks Inc. of Natick Mass. As shown, an input bus signal 810 is degrouped into a large number of data signals using a bus selector block 808, each of which then passes into the subsystem. The output signals from the subsystem 800 are re-grouped into a plurality of bus signals 810a and 810b using bus creator blocks 806 after passing from the subsystem, which results in a complicated, unclear block diagram.

According to one aspect of the present invention, shown in FIG. 10B, a block diagram 800' in a time-based block diagram includes a block 820', representing a Stateflow chart, configured to accept bus signals from another domain, such as Simulink®, without requiring degrouping of the signals forming the bus signals. For example, as shown in FIG. 10B, the block 820' accepts input bus signal 810' and outputs signal 812 and bus signals 810'a and 810'b directly, without requiring bus creator blocks or bus selector blocks. The direct interface between a first domain and a second domain greatly simplifies the block diagram.

Figure 11:
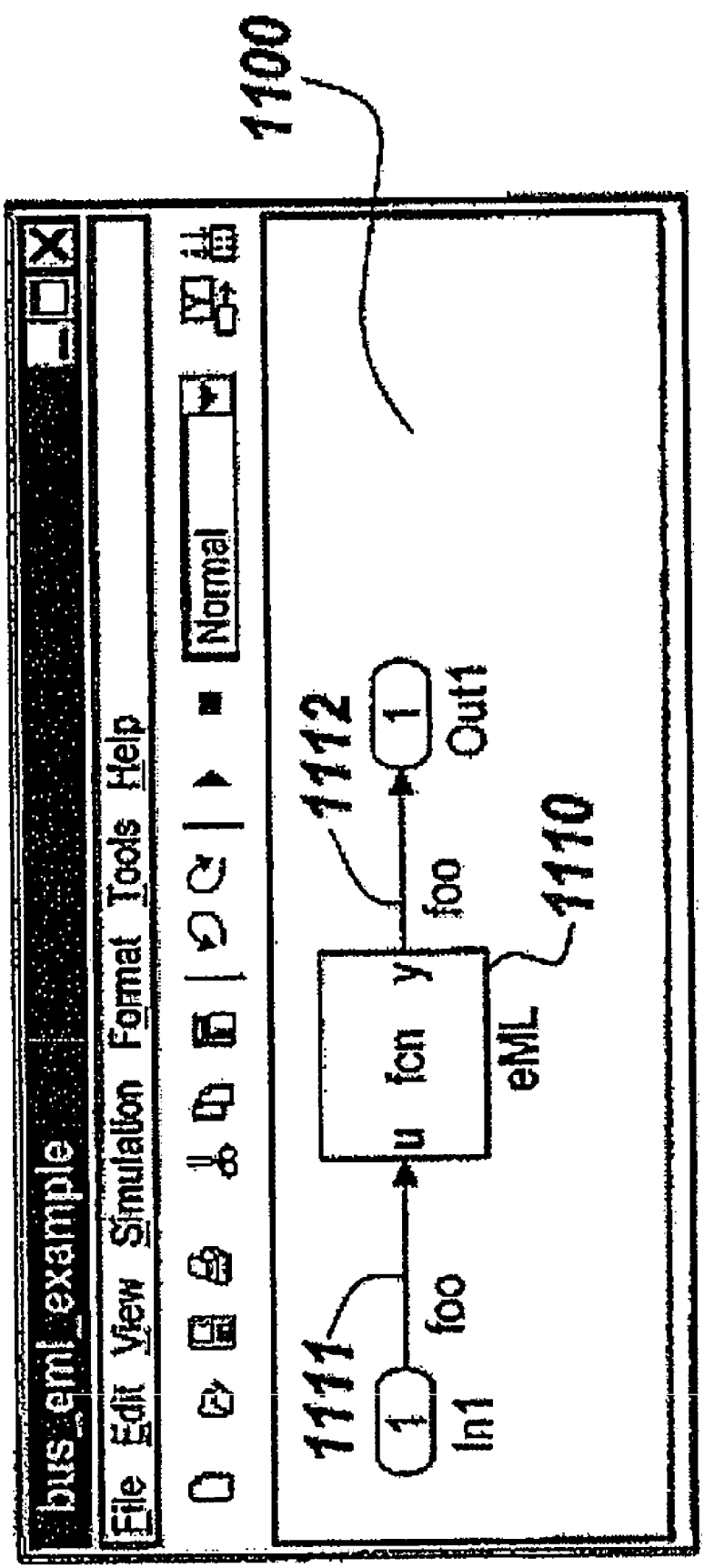
FIG. 11 illustrates a block diagram including an Embedded MATLAB block, which accesses bus signals from the block diagram domain.

In another embodiment, shown in FIGS. 11 and 12, bus signals may be passed from a first domain, for example a block diagram environment, such as Simulink®, to a second domain, for example technical computing environment, such as MATLAB. For example, as shown in FIG. 11, an Embedded MATLAB block 1110 in a Simulink block diagram 1100 can access elements of a bus signal 1111. In the illustrative embodiment, a bus signal 1111 of type "foo" is passed into an Embedded MATLAB block 1110 and output as bus signal 1112, which has the same type, "foo", as the input bus signal 1111. FIG. 12 illustrates an Embedded MATLAB editor 1200 for the second domain, which specifies the function implemented on an input signal by the Embedded MATLAB block 1110. As specified by the code in the editor 1200, the output signal "y" 1112 of the block 1110 is a function of an input signal "u" 1111 to the block 1110. The both the input signal 1111 and the output signal 1112 are bus signals of type "foo". As shown the Embedded MATLAB script, i.e., the textural based language within Simulink® can access elements of an input bus signal 1111 directly.

Figure 13:
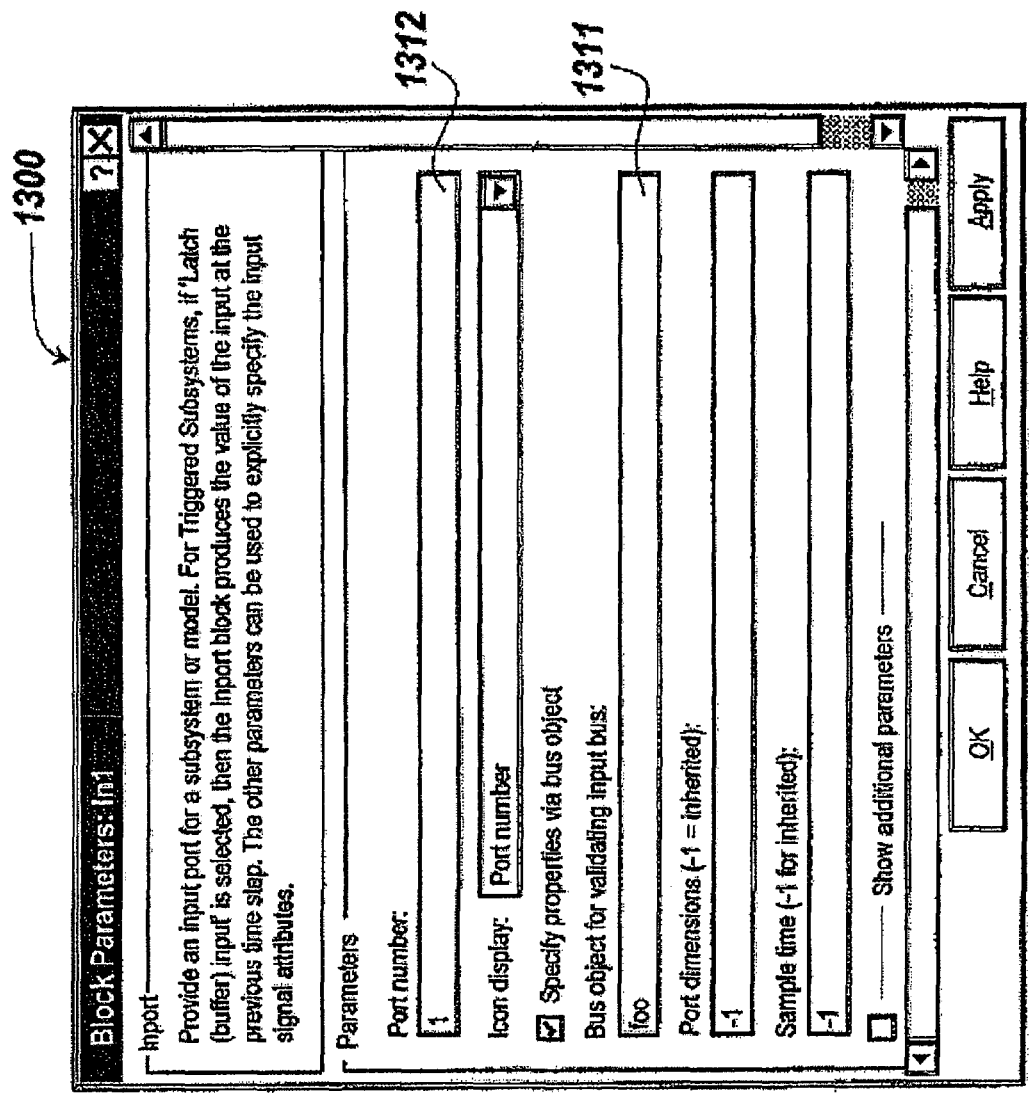
FIG. 13 illustrates a graphical user interface for specifying attributes for an input port of the MATLAB block of FIG. 11.

FIG. 13 illustrates a graphical user interface 1300 for specifying parameters of an input port for the MATLAB block 1110 of FIG. 11. As shown, the user can specify that an input signal to the MATLAB block 1110 bus signal be type "foo" or any other user specified type in field 1311. Another parameter that may be specified is the port number, in field 1312. One skilled in the art will recognize that the interface 1300 may be used to specify any suitable parameter for a component of a subsystem.

One skilled in the art will recognize that the invention is not limited to the illustrative system and that any suitable subsystem may accept bus signals. For example, bus signals may be passes as structured data between traditional block diagrams, state diagrams, truth-tables, textual programming languages, such as MATLAB, unified modeling languages (UML) or any other domain.

In the present invention, both scripting blocks, such as in Simulink, and textual functions, such as those in Stateflow and Embedded MATLAB, support the formalism of bus signals. The I/O bus signals are symbolically mapped onto appropriately named structures variables in the script. Natural syntax may be used to reference structures and/or a structure pointer in the actual scripting language used. According to an illustrative embodiment, the scripting language is preferably a Stateflow action language, and MATLAB, though one skilled in the art will recognize that the scripting language can be any synthesizable textual language, such as MATLAB, C/C++, and JAVA.

In the present invention, an execution engine leverages the structural definition of I/O buses to semantically map Simulink buses to structure variables in other programming languages. This provides a uniquely convenient method of interfacing composite signals between a time-based block diagram environment such as Simulink, and other modeling domains such as graphical state and flow diagrams, or textual languages such as MATLAB.

The present invention provides a graphical modeling environment for modeling a dynamic system that formalizes bus signals to make bus signals more effective, intuitive and easy to use. The use of bus signals having definitions entered by a user provides simplified block diagrams and facilitates data entry to make simulation of a dynamic system more efficient.

The enhanced bus signals enabled by the illustrative embodiment of the invention dramatically reducing the effort required to create, maintain, simulate and deploy the code for complex systems modeled in a diagraming application language, such as a graphical programming language.

The present invention has been described relative to an illustrative embodiment. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

The invention claimed is:

1. In an electronic device, a method comprising:
    defining a definition for a bus signal in a graphical modeling environment, the definition including:
        a specification for each data signal in a plurality of data signals, each specification specifying:
            at least one characteristic for each data signal in the plurality of data signals, the at least one characteristic differing from identifiers for each data signal;
    including the bus signal in a graphical model;
    generating computer executable instructions for implementing the definition for the bus signal; and
    using the computer executable instructions for implementing the bus signal during an execution of the graphical model, wherein the execution of the graphical model includes automatically mapping portions of the bus signal to a connected non-virtual operation block.

2. The method of claim 1, wherein the definition for the bus signal supports a set of characteristics for each data signal in the bus signal and the definition specifies the set of characteristics for the data signals in the bus signal.

3. The method of claim 1, wherein the definition for the bus signal supports a set of characteristics for each data signal in the bus signal and the definition does not specify the set of characteristics for all data signals in the bus signal.

4. The method of claim 1, wherein the definition for the bus signal defines signal type definitions for the data signals in the bus signal.

5. The method of claim 4, wherein the signal type definition comprises at least one of dimension, data type, complexity and sample rate.

6. The method of claim 1, wherein the definition for the bus signal defines implementation properties of the bus signal.

7. The method of claim 6, wherein the implementation properties of the bus signal comprise at least one of a property that indicates whether the bus is virtual or non-virtual, a property that indicates whether to use a local or global structure for the bus, and a property that indicates which bus argument passing mechanism to use.

8. The method of claim 1, wherein the execution of the graphical model includes validating constraints on the bus signal.

9. The method of claim 1, wherein the computer executable instructions implement the bus signal in the form of at least one of a structure passed by reference, a global structure referenced statically as global, formal parameters by value for the individual elements of the bus signal and individual pieces of unstructured data for the individual elements of the bus signal.

10. The method of claim 1, wherein generating computer executable instructions for implementing the bus signal further comprises:
    automatically determining an implementation variant used in implementing the bus signal, the bus signal having a plurality of implementation variants for access in different contexts, where the implementation variant is one of the plurality of implementation variants, the implementation variant selected using a metric that evaluates the plurality of implementation variants in each context in which computer executable instructions for implementing the bus signal are generated.

11. The method of claim 1, wherein defining a definition for a bus signal further comprises entering the definition for the bus signal in a graphical user interface.

12. The method of claim 11, further comprising saving the definition for the bus signal in memory.

13. The method of claim 12, wherein the definition is associated with the graphical model in memory.

14. The method of claim 12, wherein the definition is saved independently of the graphical model in memory.

15. The method of claim 14, further comprising:
    constructing a graphical model from the definition saved in memory.

16. A computer-readable storage medium holding computer-executable instructions for supporting a non-virtual bus definition in a graphical modeling environment, the medium holding instructions for:
    defining a definition for a bus signal in a graphical modeling environment, the definition including:
        a specification for each data signal in a plurality of data signals, each specification specifying:
            at least one characteristic for each data signal in the plurality of data signals, the at least one characteristic differing from identifiers for each data signal;
    including the bus signal in a graphical model;
    generating computer executable instructions for implementing the definition for the bus signal; and
    using the computer executable instructions for implementing the bus signal during an execution of the graphical model, wherein the execution of the graphical model includes automatically mapping portions of the bus signal to a connected non-virtual operation block.

17. A computer system for generating computer executable instructions for implementing a bus signal, comprising:
    a memory for storing:
        computer program instructions and
        a definition for a bus signal in a graphical modeling environment, the definition including:
            a specification for each data signal in a plurality of data signals, each specification specifying:
                at least one characteristic for each data signal in the plurality of data signals, the at least one characteristic differing from identifiers for each data signal; and a processor for executing the stored computer program instructions, the computer program instructions including instructions for:

including the bus signal in a graphical model;

generating computer executable instructions for implementing the definition for the bus signal; and using the computer executable instructions for implementing the bus signal during an execution of the graphical model, wherein the execution of the graphical model includes automatically mapping portions of the bus signal to a connected non-virtual operation block.

18. The system of claim 17, further comprising a user-operable input means for inputting the definition into a graphical user interface.

* * * * *

UNITED STATES PATENT AND TRADEMARK OFFICE
CERTIFICATE OF CORRECTION

PATENT NO. : 7,558,721 B2
APPLICATION NO. : 11/842001
DATED : July 7, 2009
INVENTOR(S) : Peter Szpak et al.

Page 1 of 1

It is certified that error appears in the above-identified patent and that said Letters Patent is hereby corrected as shown below:

Title Page; item (56);

Cover page 2, (Other Publications) column 1, line 6, please change "vol." to --Vol.--

Cover page 2, (Other Publications) column 1, line 11, please change "vol." to --Vol.--

Cover page 2, (Other Publications) column 2, line 4, please change "vol." to --Vol.--

At column 8, line 10, please add --.-- after process

At column 11, line 30, change "have" to --has--

At column 14, line 53, change "an" to --a--

At column 15, line 34, change "of" to --if--

At column 16, line 35, delete "The" before both

At column 16, line 35, capitalize the "b" in both

Signed and Sealed this

Twenty-second Day of September, 2009

David J. Kappos
*Director of the United States Patent and Trademark Office*